(12) United States Patent
Tsai

(10) Patent No.: US 11,269,196 B2
(45) Date of Patent: Mar. 8, 2022

(54) EYEGLASSES HAVING A SNAP-ON ONE-PIECE LENS

(71) Applicant: York Tsai, New Taipei (TW)

(72) Inventor: York Tsai, New Taipei (TW)

( * ) Notice: Subject to any disclaimer, the term of this patent is extended or adjusted under 35 U.S.C. 154(b) by 197 days.

(21) Appl. No.: 16/690,682

(22) Filed: Nov. 21, 2019

(65) Prior Publication Data

US 2021/0088809 A1 Mar. 25, 2021

(30) Foreign Application Priority Data

Sep. 19, 2019 (TW) ................... 108212365

(51) Int. Cl.
| | |
|---|---|
| *G02C 1/08* | (2006.01) |
| *G02C 5/12* | (2006.01) |
| *G02C 5/10* | (2006.01) |
| G02C 5/02 | (2006.01) |
| G02C 9/00 | (2006.01) |

(52) U.S. Cl.
CPC ............. *G02C 1/08* (2013.01); *G02C 5/10* (2013.01); *G02C 5/12* (2013.01); *G02C 5/126* (2013.01); *G02C 5/02* (2013.01); *G02C 9/00* (2013.01); *G02C 2200/08* (2013.01)

(58) Field of Classification Search
CPC ....................................................... G02C 1/08
See application file for complete search history.

(56) References Cited

U.S. PATENT DOCUMENTS

| | | | | |
|---|---|---|---|---|
| 4,977,627 | A * | 12/1990 | Metcalfe ................ | G02C 11/08 2/437 |
| 5,768,716 | A * | 6/1998 | Porsche .................. | G02C 1/04 351/63 |
| 2005/0036104 | A1* | 2/2005 | Howard ................... | G02C 1/04 351/131 |
| 2005/0270475 | A1* | 12/2005 | Curci .................. | G02C 5/2263 351/69 |
| 2013/0314660 | A1* | 11/2013 | Chen ....................... | G02C 1/08 351/86 |

* cited by examiner

*Primary Examiner* — Cara E Rakowski
(74) *Attorney, Agent, or Firm* — Muncy, Geissler, Olds & Lowe, P.C.

(57) ABSTRACT

A pair of eyeglasses includes a primary lens, a primary lens frame including upper and lower frame sections, and at least one snap-on unit disposed between the primary lens and the primary lens frame and including upper and lower engaging members respectively provided on top and bottom portions of the primary lens, and upper and lower engaging blocks respectively protruding from the upper and lower frame sections toward the primary lens. The top and bottom portions of the primary lens are removably embedded in the upper and lower frame sections through snapping engagement between the upper engaging block and the upper engaging member and between the lower engaging block and the lower engaging member.

11 Claims, 9 Drawing Sheets

EYEGLASSES HAVING A SNAP-ON ONE-PIECE LENS

CROSS-REFERENCE TO RELATED APPLICATION

This application claims priority to Taiwanese Patent Application No. 108212365, filed on Sep. 19, 2019.

FIELD

The disclosure relates to an eyeglass, more particularly to a pair of eyeglasses having a snap-on one-piece lens.

BACKGROUND

Referring to FIG. 1, a pair of conventional eyeglasses is shown to include a lens frame 7 and a lens 8 embedded in the lens frame 7. The lens frame 7 has an upper frame section 71 and a lower frame section 72 integrally connected to each other. Since the structural strengths of middle portions of the upper and lower frame sections 71, 72 are weak, the lens frame 7 further has a fixing portion 73 interconnecting the middle portions of the upper and lower frame sections 71, 72. Apart from strengthening the structural strength of the lens frame 7, the bonding strength of the lens 8 can also be enhanced. However, although the fixing portion 73 can provide a good fixation effect to the lens of the conventional eyeglasses, it can also cause a blind spot during use by a user, and limits the appearance of the conventional eyeglasses. Moreover, when the fixing portion 73 is subjected to an external force, the upper and lower frame sections 71, 72 are simultaneously pulled, so that the lens frame 7 is easily deformed. Thus, there is still room for improvement of the conventional eyeglasses.

SUMMARY

Therefore, an object of the present disclosure is to provide a pair of eyeglasses that is capable of alleviating at least one of the drawbacks of the prior art.

According to this disclosure, a pair of eyeglasses includes a primary lens, a primary lens frame for embedding the primary lens therein, and at least one snap-on unit disposed between the primary lens and the primary lens frame. The primary lens frame includes an upper frame section and a lower frame section cooperatively surrounding the primary lens. The at least one snap-on unit includes an upper engaging member provided on a top portion of the primary lens, an upper engaging block protruding from the upper frame section toward the primary lens for snapping engagement with the upper engaging member, a lower engaging member provided on a bottom portion of the primary lens, and a lower engaging block protruding from the lower frame section toward the primary lens for snapping engagement with the lower engaging member. The top portion and the bottom portion of the primary lens are removably embedded in the upper frame section and the lower frame section through snapping engagement between the upper engaging block and the upper engaging member and between the lower engaging block and the lower engaging member.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
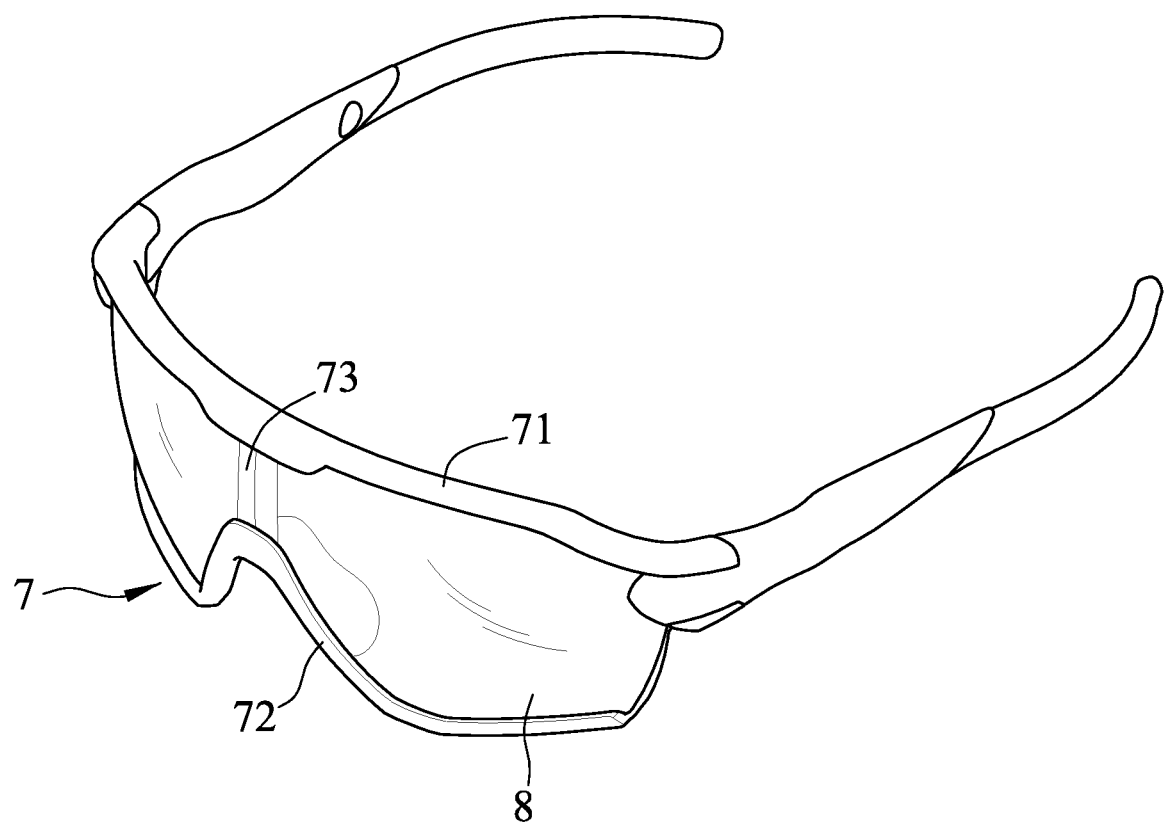
FIG. 1 is a perspective view of a pair of conventional eyeglasses.

Before the present disclosure is described in greater detail, it should be noted herein that like elements are denoted by the same reference numerals throughout the disclosure.

Figure 2:
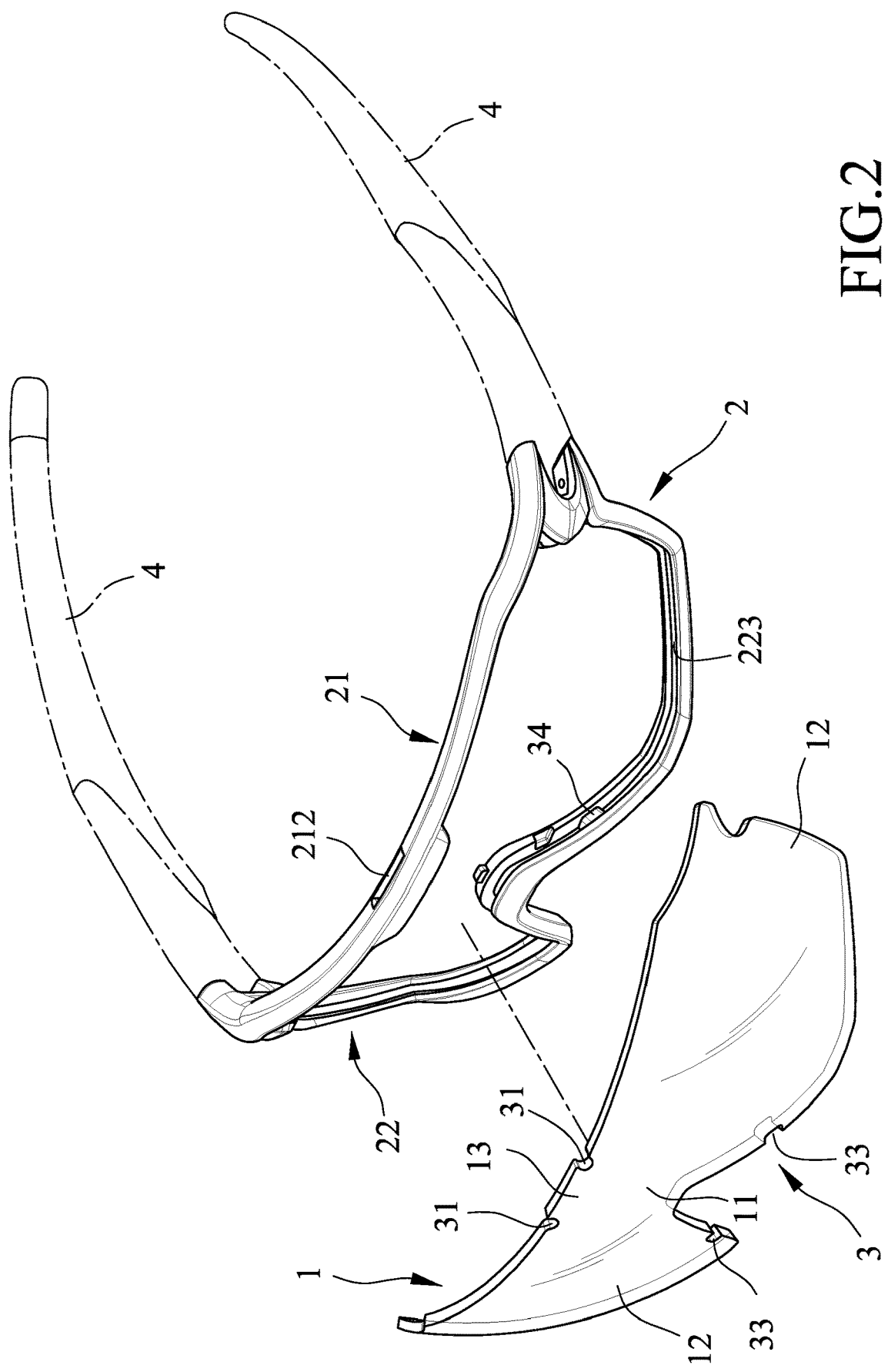
FIG. 2 is an exploded perspective view of a pair of eyeglasses according to the first embodiment of the present disclosure.

Referring to FIG. 2, a pair of eyeglasses according to the first embodiment of the present disclosure is suitable to be worn by a user (not shown) as sports sunglasses, and is shown to comprise a primary lens 1, a primary lens frame 2, two snap-on units 3, and two temples 4. It should be noted herein that the temples 4 are connected pivotally and respectively to left and right sides of the primary lens frame 2 in this embodiment, but the connecting method of the temples 4 to the primary lens frame 2 is not limited thereto, as long as the primary lens frame 2 can be fixed to the face portion of the user through the temples 4, any connecting method between the two is acceptable.

The primary lens 1 includes a bridge portion 11, two lens body portions 12 extending integrally, outwardly and respectively from left and right sides of the bridge portion 11, and a first coupling portion 13 extending upwardly and integrally from a top end of the bridge portion 11. In this embodiment, the first coupling portion 13 is a protrusion.

The primary lens frame 2 is provided for embedding the primary lens therein, and includes an upper frame section 21 and a lower frame section 22 integrally connected to each other and cooperatively surrounding the primary lens 1.

Figure 3:
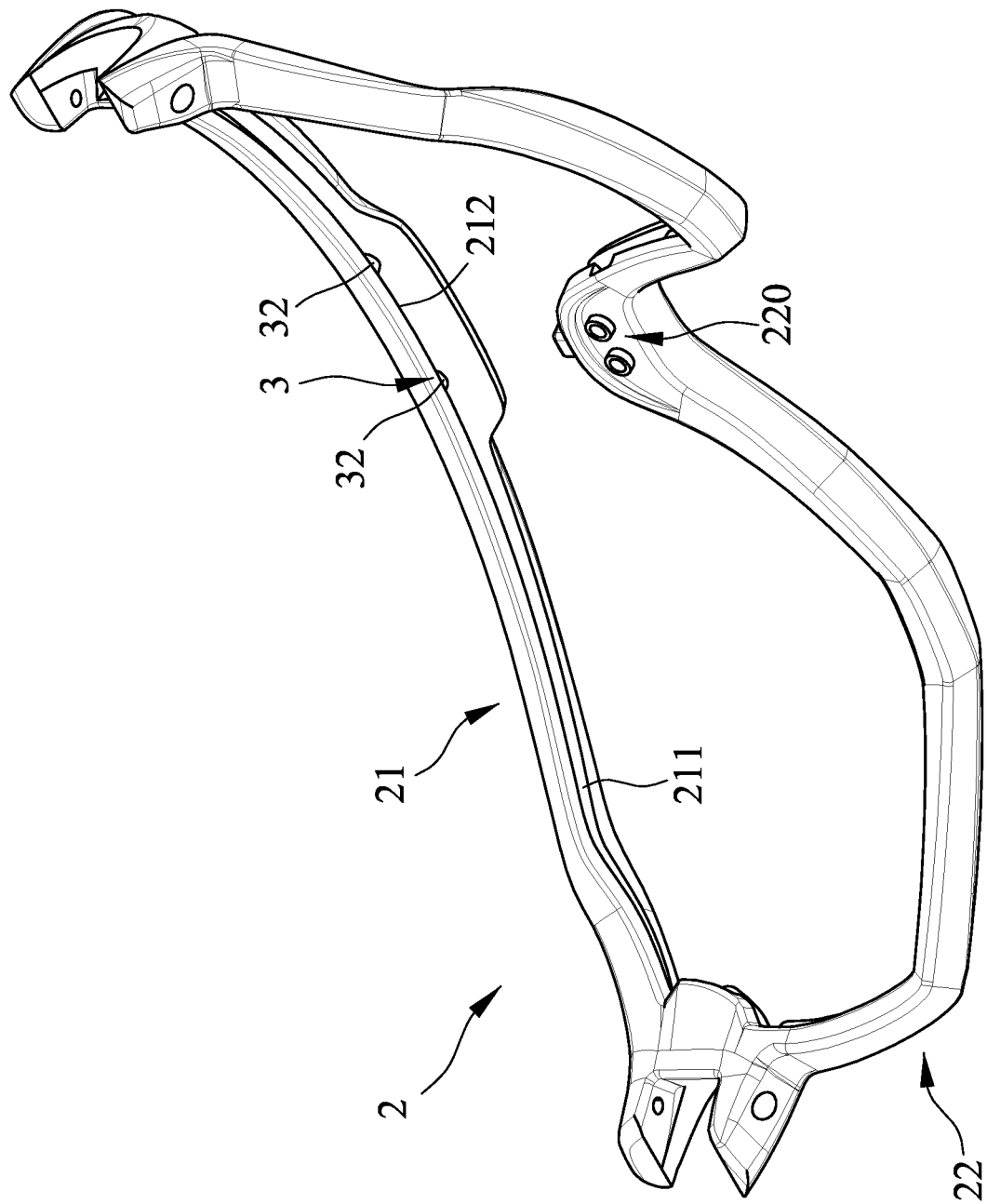
FIG. 3 is a perspective view of a primary lens frame of the first embodiment.
Figure 4:
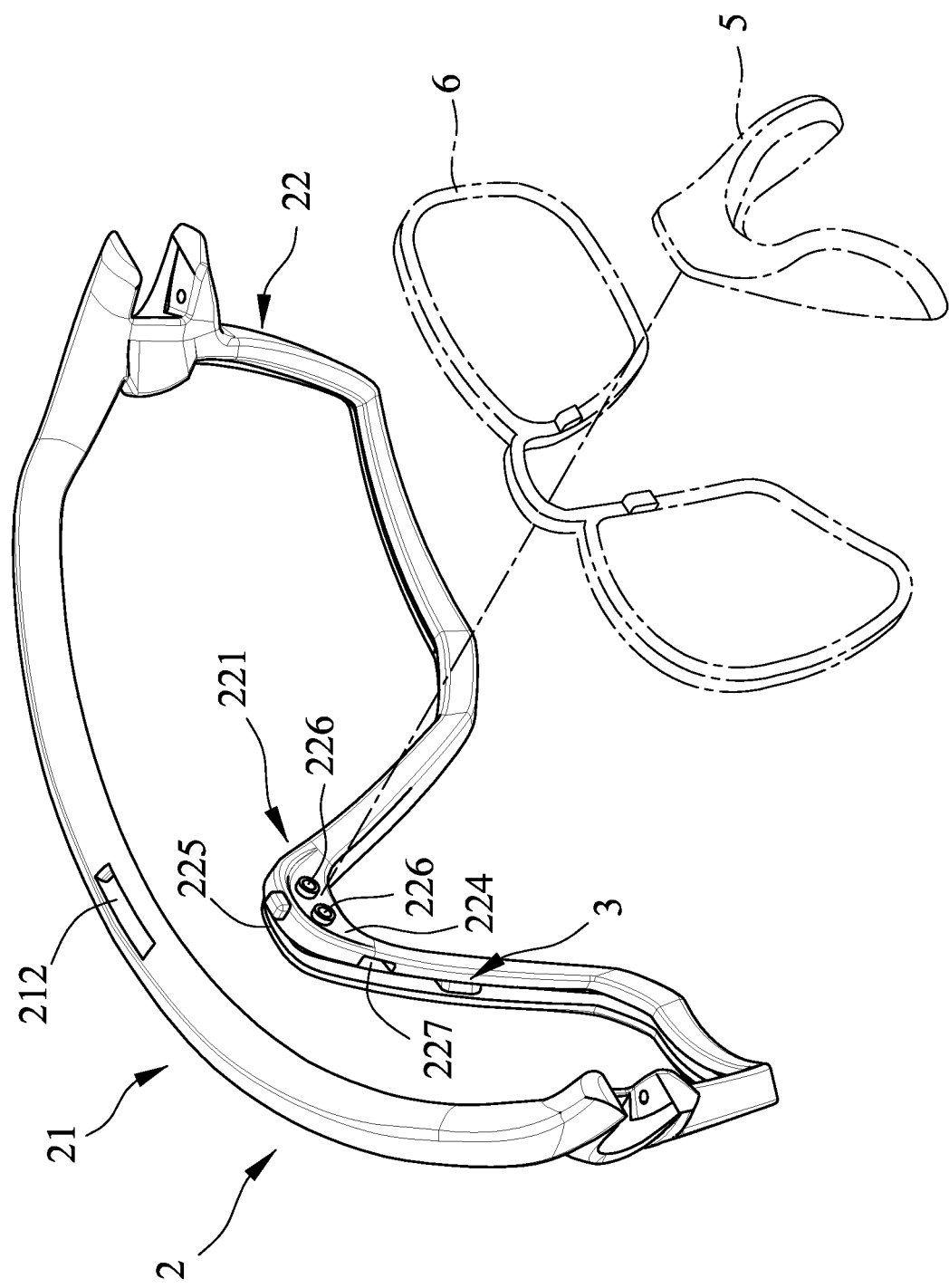
FIG. 4 is a view similar to FIG. 3, but taken from another angle, illustrating how a secondary lens frame and a nose pad may be connected to the primary lens frame.

To clearly illustrate the structures of the primary lens 1 and the primary lens frame 2 and their connection method, the temples 4 are not shown in FIGS. 3 to 7; and to further clearly illustrate the structure of the primary lens frame 2, the primary lens 1 is not shown in FIGS. 3 and 4.

Figure 5:
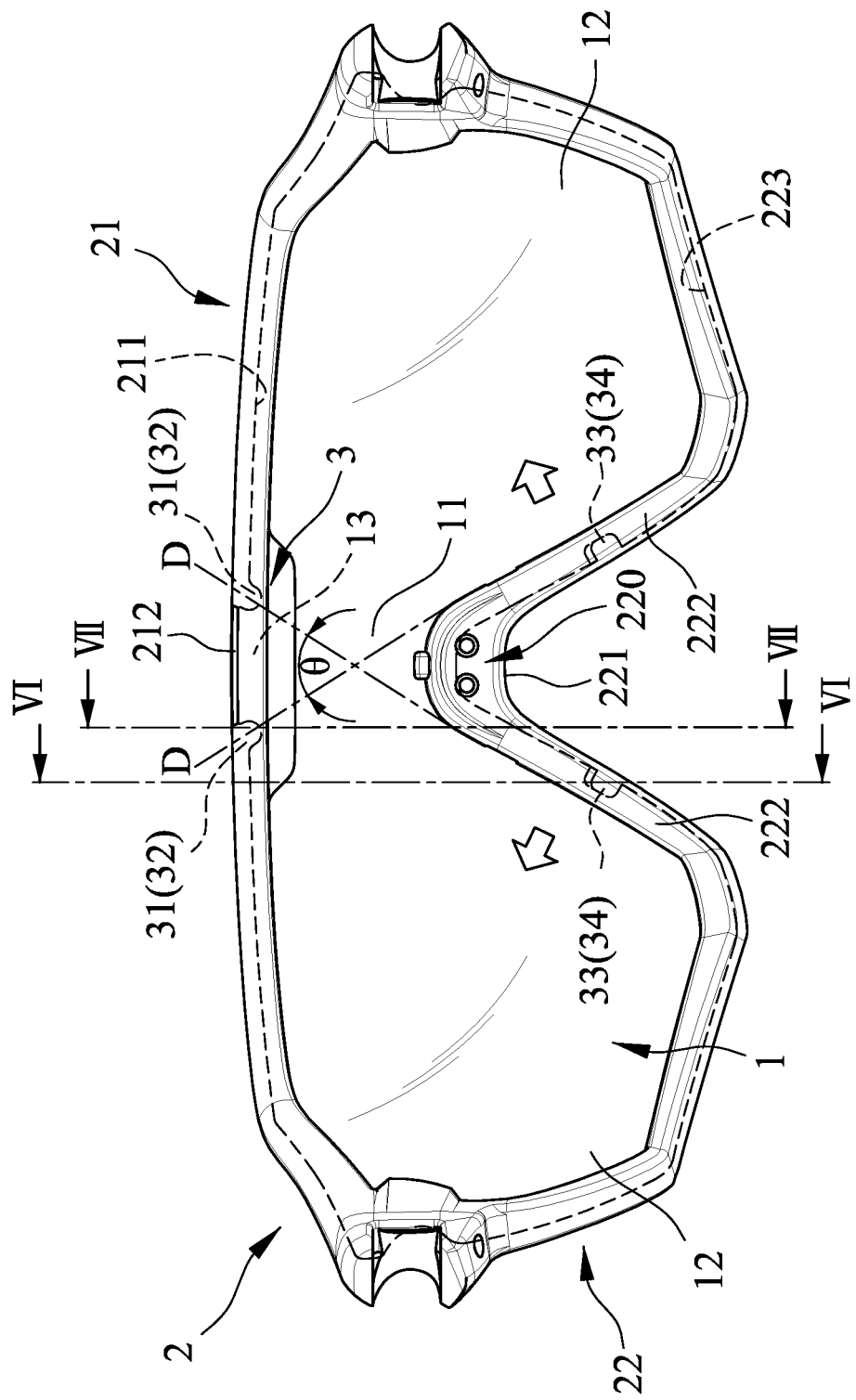
FIG. 5 is an assembled rear schematic view of the first embodiment, but without the temples.

Referring to FIGS. 3 to 5, the upper frame section 21 is formed with an upper groove 211 extending along the length thereof and having an opening that faces the lower frame section 22, and has a second coupling portion 212 corresponding to the first coupling portion 13 for coupling with the same. In this embodiment, the second coupling portion 212 is a through slot for receiving the first coupling portion 13 therein.

With reference to FIGS. 2 and 5, the lower frame section 22 has a nose frame 220 including an intermediate portion 221, and two side portions 222 extending downwardly, inclinedly and respectively from two opposite ends of the intermediate portion 221 away from each other. The lower frame section 22 is formed with a lower groove 223 extending along the length thereof and having an opening that faces the upper frame section 21.

With reference to FIG. 4, the intermediate portion 221 of the nose frame 220 has an inner side 224 facing the user, and an outer side 225 opposite to the inner side 224. The inner side 224 is formed with two engaging grooves 226 extending inwardly therefrom for engagement with a nose pad 5. The intermediate portion 221 further has two connecting notches 227 (only one is visible in FIG. 4) respectively provided on left and right sides thereof for connection with a secondary lens frame 6. It should be noted herein that the inner side 224 may be formed with one engaging groove 226 for connection with different style of nose pads 5. Since this embodiment is mainly use as sports sunglasses, if the user has myopia or astigmatism, the secondary lens frame 6 with corrective lenses may be mounted to the primary lens frame 2 by engaging with the connecting notches 227, so that the vision of the user may be clear.

Referring again to FIGS. 2 and 5, the snap-on units 3 are spacedly disposed between the primary lens 1 and the primary lens frame 2. Each snap-on unit 3 includes an upper engaging member 31 which is configured as a notch extending inwardly from the top end of the bridge portion 11 and adjacent to the first coupling portion 13, an upper engaging block 32 protruding from the upper frame section 21 toward the primary lens 1 for snapping engagement with the upper engaging member or notch 31, a lower engaging member 33 which is configured as a notch extending inwardly from a respective one of the lens body portions 12 and proximate to a bottom end of the bridge portion 11, and a lower engaging block 34 protruding from one of the side portions 222 of the nose frame 220 toward the primary lens 1 for snapping engagement with the lower engaging member or notch 33.

In this embodiment, the upper engaging notches 31 of the snap-on units 3 are located on two opposite sides of the first coupling portion 13 and are spaced apart from each other in a horizontal direction, and the lower engaging notches 33 of the snap-on units 3 are located on the lens body portions 12 in proximity to the bridge portion 11. Moreover, the upper engaging blocks 32 of the snap-on units 3 protrude from the upper frame section 21 toward the nose frame 220, and extend inclinedly toward each other, such that extending directions (D) of the upper engaging blocks 32 intersect each other and form an acute angle (θ), as shown in FIG. 5. The lower engaging blocks 34 of the snap-on units 3 respectively protrude from the side portions 222 of the nose frame 220 toward the primary lens 1. Since a horizontal distance between the lower engaging blocks 34 is larger than a horizontal distance between the upper engaging blocks 32, the upper engaging blocks 32 and the lower engaging blocks 34 are in a staggered arrangement, so that, as compared to a longitudinal alignment, lateral engaging forces can be generated in coordination with inclined forces, thereby stabilizing the connection between the primary lens 1 and the primary lens frame 2.

Figure 6:
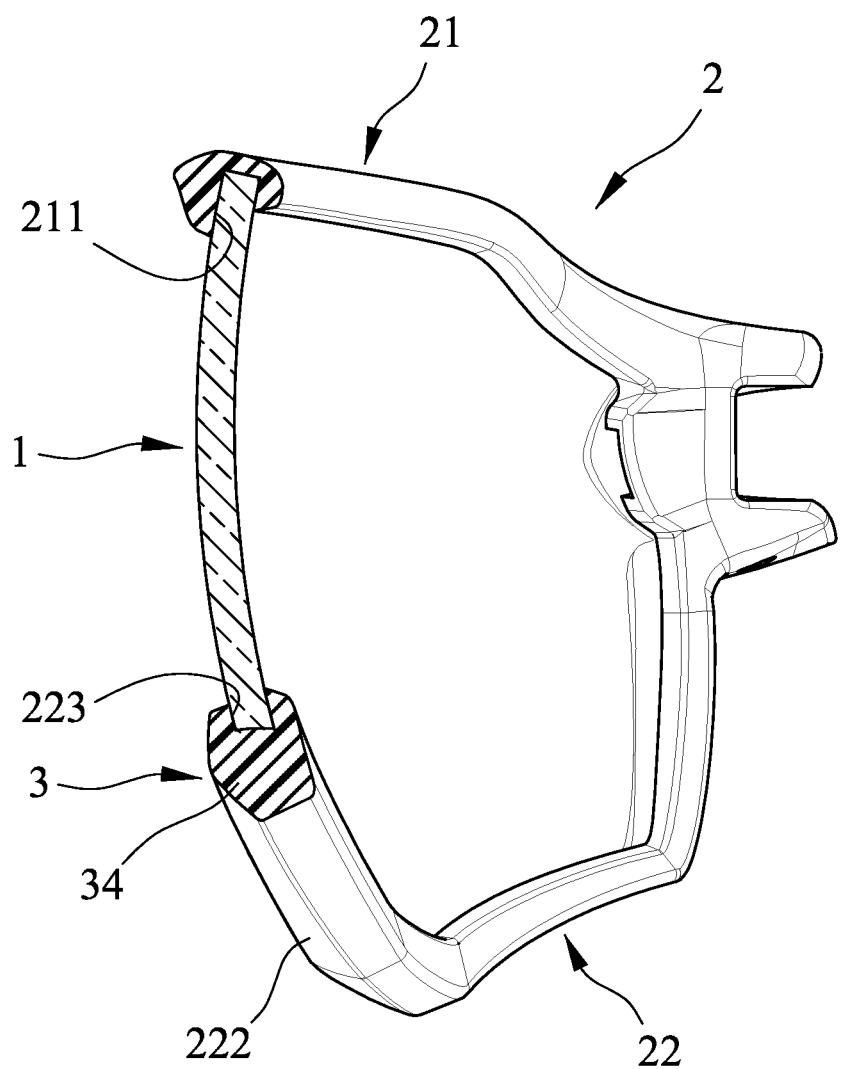
FIG. 6 is a sectional view of the first embodiment taken along line VI-VI of FIG. 5.
Figure 7:
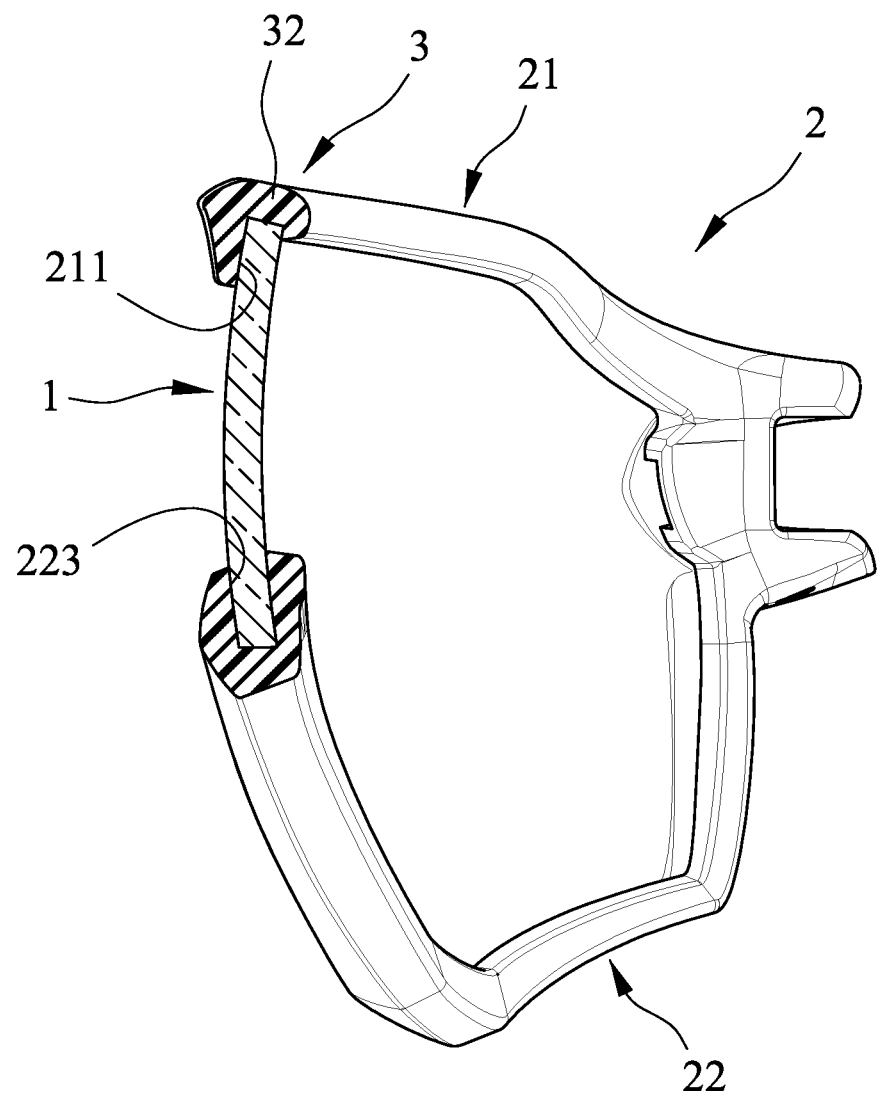
FIG. 7 is a sectional view of the first embodiment taken along line VII-VII of FIG. 5.

Referring to FIGS. 6 and 7, in combination with FIG. 5, to assemble the primary lens 1 and the primary lens frame 2 of this embodiment, the lower engaging notches 33 of the snap-on units 3 are first aligned with the respective lower engaging blocks 34 of the snap-on units 3, and the upper engaging notches 31 of the snap-on units 3 are aligned with the respective upper engaging blocks 32 of the snap-on units 3, after which the lower engaging blocks 34 are snap-engaged with the respective lower engaging notches 33, so that a bottom portion and left and right sides of the primary lens 1 are embedded in the lower groove 223, as shown in FIG. 6. Finally, the upper engaging blocks 32 are snap-engaged with the respective upper engaging notches 31, so that the first coupling portion is engaged with the second coupling portion 212, and the top portion of the primary lens 1 is embedded in the upper groove 211, as shown in FIG. 7, thereby completing the assembly of the primary lens 1 and the primary lens frame 2.

When the primary lens 1 is embedded in the primary lens frame 2, top edges of the lens body portions 12 are fitted in the upper groove 211 of the upper frame section 21, and bottom edges of the lens body portions 12 are fitted in the lower groove 223 of the lower frame section 22. Further, the first coupling portion 13 is engaged with the second coupling portion 212, so that when this embodiment is hit by an external force during exercise of the user, the upper frame section 21 and the lower frame section 22 can still cooperate with each other to clamp the primary lens 1 therebetween. Thus, a peripheral edge of the primary lens 1 can be sustained in the upper groove 211 and the lower groove 223, and will not fall off from the primary lens frame 2.

Moreover, since the upper engaging blocks 32 protrude from the upper frame section 21 toward the nose frame 220, they can generate supporting force for supporting the bridge portion 11. Further, the upper engaging blocks 32 extend inclinedly toward each other, apart from longitudinal engaging forces, they can further generate horizontal positioning forces, thereby enhancing the connection strength between the primary lens 1 and the primary lens frame 2. At this same time, the lower engaging blocks 34 respectively protruding from the side portions 222 toward the upper frame section 21 can also generate supporting force, as shown by the arrows in FIG. 5, for respectively supporting the lens body portions 12, so that the primary lens 1 can be evenly supported by and cannot be easily detached from the primary lens frame 2. Further, the primary lens 1 is less likely to break due to uneven supporting forces.

Therefore, the primary lens 1 can be stably fixed to the primary lens frame 2 even if there is no provision of a fixing structure for engaging the upper frame section 21 and the lower frame section 22, and the line of sight of the user will not blocked by any fixing structure so that a blind spot can be avoided. Further, the appearance of the first embodiment is more diverse since it will not be restricted by the fixing structure. It should be noted herein that the number of the snap-on units 3 is not limited to two, and may be one only in the first embodiment. The effect of stably positioning the primary lens 1 to the primary lens frame 2 may also be similarly achieved.

Figure 8:
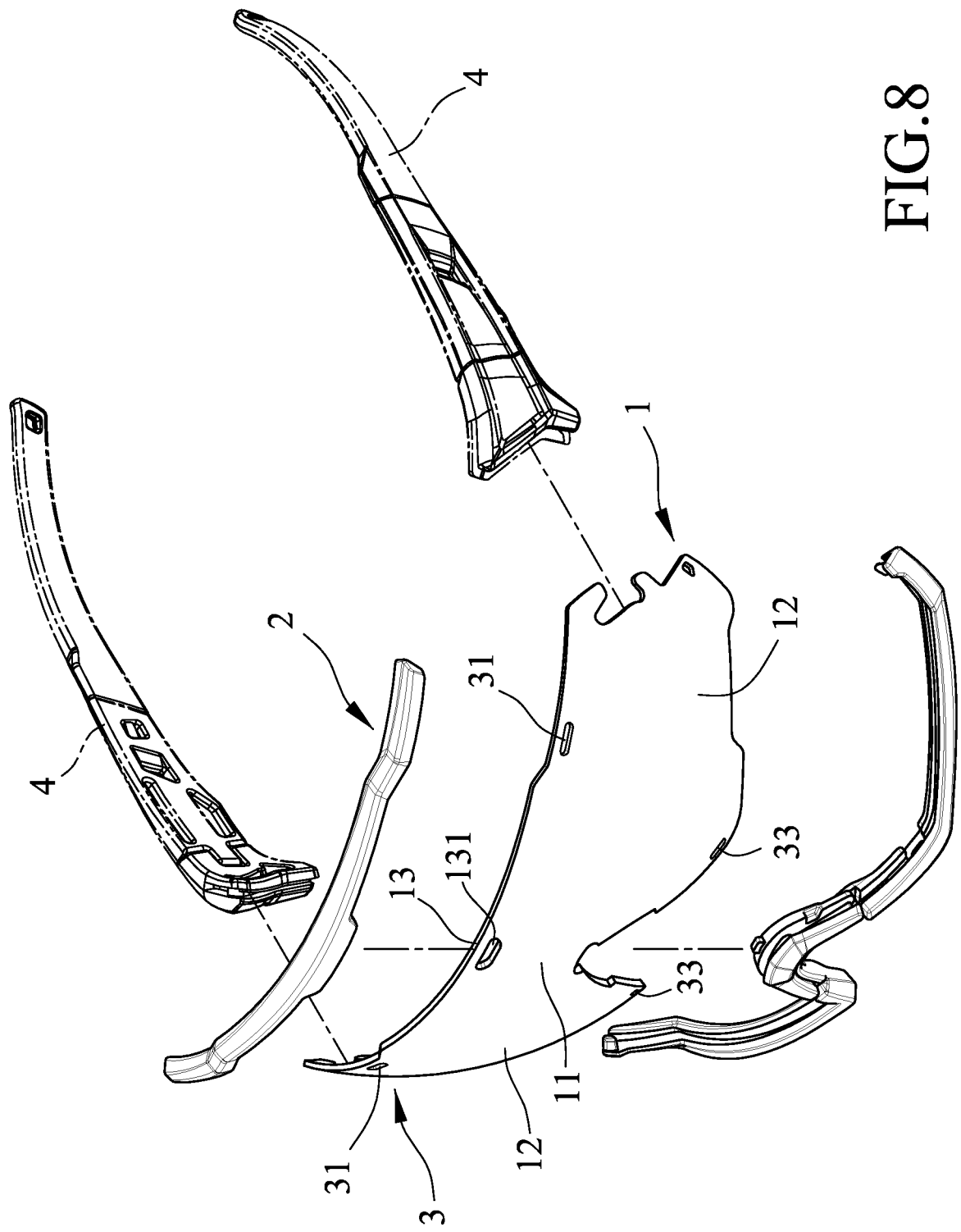
FIG. 8 is an exploded perspective view of a pair of eyeglasses according to the second embodiment of the present disclosure.
Figure 9:
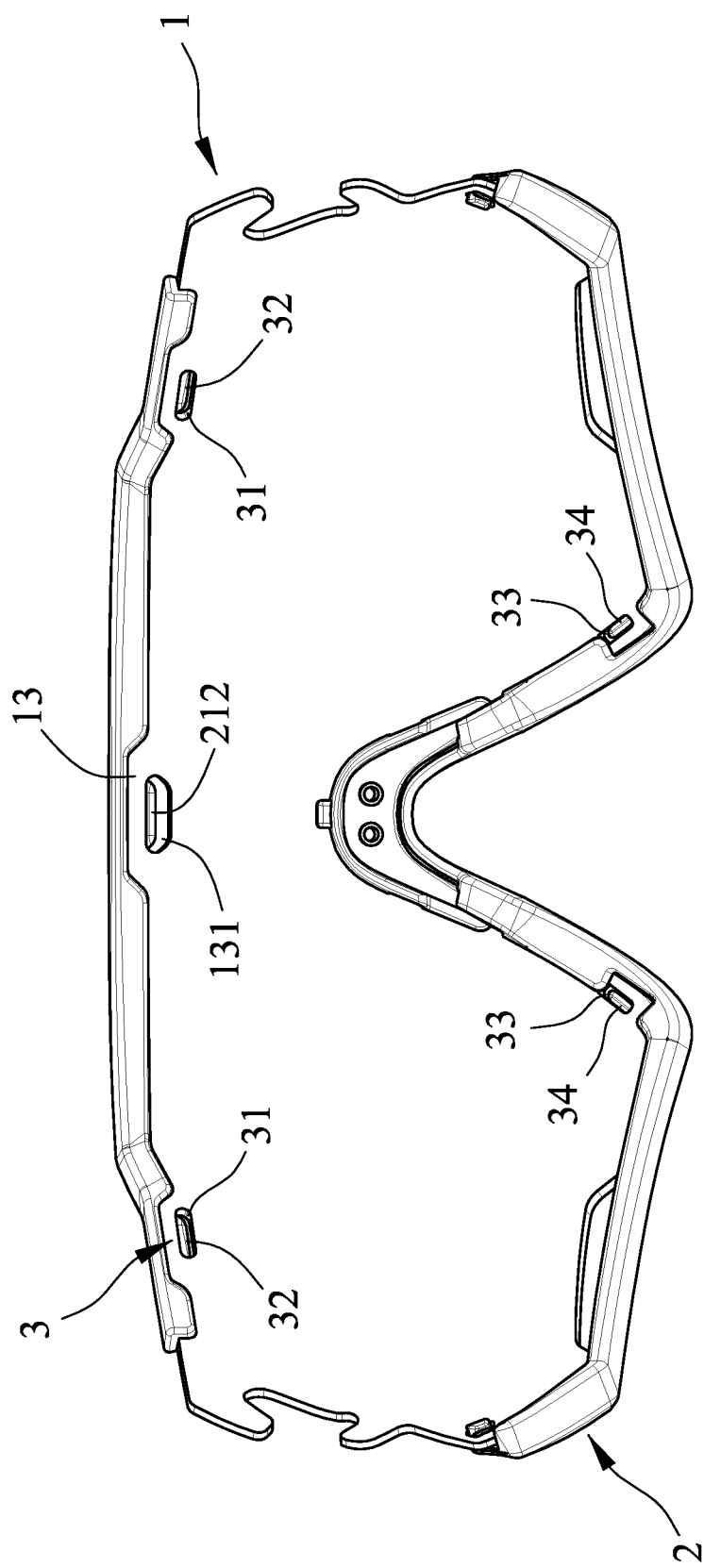
FIG. 9 is an assembled rear schematic view of the second embodiment, but without the temples.

FIGS. 8 and 9 illustrate a pair of eyeglasses according to the second embodiment of this disclosure. It should be noted herein that in order to clearly illustrate the connection between the primary lens 1 and the primary lens frame 2, the temples 4 are not shown in FIG. 9.

The second embodiment is generally identical to the first embodiment, and only differs in that: the upper engaging members 31 of the snap-on units 3 are configured as slots extending through the respective lens body portions 12 of the primary lens 1 in proximity to the top end thereof; the lower engaging members 33 of the snap-on units 3 are configured as slots extending through the respective lens body portions 12 of the primary lens 1 in proximity to the bottom end thereof; each of the upper engaging blocks 32 protrudes from the upper frame section 21 toward the user and is inserted into a respective one of the upper engaging members or slots 31; and each of the lower engaging blocks 34 protrudes from one of the side portions 222 of the nose frame 220 toward the user and is inserted into a respective one of the lower engaging members or slots 33. Moreover, the first coupling portion 13 of the primary lens 1 is formed with a coupling slot 131 extending through the bridge portion 11 in proximity to the top end thereof, and the second coupling portion 212 of the upper frame section 21 is a protruding block for extension into the coupling slot 131. Through this, apart from achieving the same effect of the first embodiment, the second embodiment can further provide an aspect different from the first embodiment for the user to select.

In sum, in the pair of eyeglasses of this disclosure, the upper engaging blocks 32 are respectively snap-engaged to the upper engaging members 31, and the lower engaging blocks 34 are respectively snap-engaged to the lower engaging members 33, so that a plurality of sides of the primary lens 1 can be embedded in the primary lens frame 2 at the same time. Moreover, with the upper engaging blocks 32 extending inclinedly toward each other and in a staggered arrangement with the lower engaging blocks 34, apart from generating longitudinal engaging forces along their respective extension directions, they can further generate additional horizontal positioning forces. Through this, the connection strength between the primary lens frame 2 and the primary lens 1 can be increased, and a blind spot can be avoided so that the appearance of the eyeglasses of this disclosure is more diverse. Hence, the object of this disclosure can indeed be achieved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A pair of eyeglasses comprising:
    a primary lens;
    a primary lens frame for embedding said primary lens therein and including an upper frame section and a lower frame section cooperatively surrounding said primary lens; and
    at least one snap-on unit disposed between said primary lens and said primary lens frame, and including an upper engaging member provided on a top portion of said primary lens, an upper engaging block protruding from said upper frame section toward said lower frame section for snapping engagement with said upper engaging member, a lower engaging member provided on a bottom portion of said primary lens, and a lower engaging block protruding from said lower frame section toward said upper frame section for snapping engagement with said lower engaging member, said top portion and said bottom portion of said primary lens being removably embedded in said upper frame section and said lower frame section through snapping engagement between said upper engaging block and said upper engaging member and between said lower engaging block and said lower engaging member,
    wherein said upper engaging member extends inwardly from a top end of said primary lens, and said lower engaging member extends inwardly from a bottom end of said primary lens.

2. The pair of eyeglasses as claimed in claim 1, wherein said pair of eyeglasses comprises a plurality of said snap-on units.

3. The pair of eyeglasses as claimed in claim 2, wherein said primary lens includes a bridge portion, and two lens body portions extending integrally, outwardly and respectively from left and right sides of said bridge portion, said upper engaging members of said snap-on units being spaced apart from each other in a horizontal direction and extending inwardly from a top end of said bridge portion, said lower engaging members of said snap-on units extending inwardly and respectively from said lens body portions and proximate to said bridge portion.

4. The pair of eyeglasses as claimed in claim 3, wherein said primary lens further includes a first coupling portion extending upwardly from said top end of said bridge portion, said upper frame section having a second coupling portion corresponding to said first coupling portion for coupling with said first coupling portion.

5. The pair of eyeglasses as claimed in claim 4, wherein said second coupling portion is a through slot.

6. The pair of eyeglasses as claimed in claim 4, wherein said first coupling portion is formed with a coupling slot, and said second coupling portion is a protruding block.

7. The pair of eyeglasses as claimed in claim 1, wherein said lower frame section has a nose frame including an intermediate portion and two side portions extending downwardly, inclinedly and respectively from two opposite ends of said intermediate portion away from each other, said lower engaging blocks of said snap-on units respectively protruding from said side portions toward said primary lens.

8. The pair of eyeglasses as claimed in claim 7, wherein said upper engaging blocks of said snap-on units protrude from said upper frame section toward said nose frame.

9. The pair of eyeglasses as claimed in claim 8, wherein extending directions of said upper engaging blocks intersect each other and form an acute angle.

10. The pair of eyeglasses as claimed in claim 8, wherein a horizontal distance between said lower engaging blocks is larger than a horizontal distance between said upper engaging blocks.

11. A pair of eyeglasses comprising:
    a primary lens;
    a primary lens frame for embedding said primary lens therein and including an upper frame section and a lower frame section cooperatively surrounding said primary lens; and
    at least one snap-on unit disposed between said primary lens and said primary lens frame, and including an upper engaging member provided on a top portion of said primary lens, an upper engaging block protruding from said upper frame section toward said primary lens for snapping engagement with said upper engaging member, a lower engaging member provided on a bottom portion of said primary lens, and a lower engaging block protruding from said lower frame section toward said primary lens for snapping engagement with said lower engaging member, said top portion and said bottom portion of said primary lens being removably embedded in said upper frame section and said lower frame section through snapping engagement between said upper engaging block and said upper engaging member and between said lower engaging block and said lower engaging member;

wherein said upper engaging member and said lower engaging member are configured as slots, said upper engaging block being configured to protrude from said upper frame section toward a user and being inserted into said upper engaging member, said lower engaging block being configured to protrude from said lower frame section toward the user and being inserted into said lower engaging member.

\* \* \* \* \*